United States Patent
Kang

(10) Patent No.: US 12,007,503 B2
(45) Date of Patent: Jun. 11, 2024

(54) METHOD AND APPARATUS FOR REAR CROSS COLLISION WARNING

(71) Applicant: HYUNDAI MOBIS CO., LTD., Seoul (KR)

(72) Inventor: Eun Seok Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 537 days.

(21) Appl. No.: 17/239,890

(22) Filed: Apr. 26, 2021

(65) Prior Publication Data
US 2021/0364600 A1   Nov. 25, 2021

(30) Foreign Application Priority Data

May 22, 2020   (KR) ......................... 10-2020-0061847

(51) Int. Cl.
*G01S 7/41* (2006.01)
*G01S 13/52* (2006.01)
*G01S 13/931* (2020.01)
*G08G 1/16* (2006.01)

(52) U.S. Cl.
CPC .............. *G01S 7/415* (2013.01); *G01S 13/52* (2013.01); *G01S 13/931* (2013.01); *G08G 1/16* (2013.01)

(58) Field of Classification Search
CPC ........ G01S 7/415; G01S 13/52; G01S 13/931; G08G 1/16
See application file for complete search history.

(56) References Cited

U.S. PATENT DOCUMENTS

| | | | |
|---|---|---|---|
| 9,834,210 B2 * | 12/2017 | Ohbayashi | B60W 10/20 |
| 10,011,278 B2 * | 7/2018 | Himi | G01S 13/87 |
| 10,296,001 B2 * | 5/2019 | Smith | G01S 13/865 |
| 10,495,732 B2 * | 12/2019 | Olshansky | B60W 30/09 |
| 11,262,442 B2 * | 3/2022 | Takada | G01S 7/415 |
| 11,358,600 B2 * | 6/2022 | Ziegler | B60W 30/16 |

(Continued)

FOREIGN PATENT DOCUMENTS

| | | |
|---|---|---|
| CN | 101369020 A | 2/2009 |
| CN | 110940980 A | 3/2020 |

(Continued)

OTHER PUBLICATIONS

Extended European Search Report dated Oct. 21, 2021 in counterpart European Patent Application No. 21172278.0 (9 pages in English).

(Continued)

*Primary Examiner* — Peter M Bythrow
(74) *Attorney, Agent, or Firm* — NSIP Law

(57) ABSTRACT

A method with rear cross collision warning includes: dividing a surrounding area of a host vehicle into a plurality of cells arranged in lateral and longitudinal directions; creating a grid map on which cells, among the plurality of cells, corresponding to positions where a stationary object around the host vehicle is viewed are classified as occupied cells; determining a position of a reflective structure reflecting radar signals based on a positional relationship between the occupied cells on the grid map; and determining, based on the determined position of the reflective structure and either one of a position of a tracking target viewed by the radar and moving direction of the tracking target, whether the tracking target is a ghost tracking target.

17 Claims, 15 Drawing Sheets

(56) References Cited

U.S. PATENT DOCUMENTS

| | | | |
|---|---|---|---|
| 2003/0179129 A1* | 9/2003 | Tamatsu | G01S 13/582 |
| | | | 342/107 |
| 2009/0045928 A1* | 2/2009 | Rao | B60Q 9/006 |
| | | | 340/435 |
| 2012/0056773 A1* | 3/2012 | Sato | G01S 7/354 |
| | | | 342/109 |
| 2013/0314272 A1* | 11/2013 | Gross | G01S 13/931 |
| | | | 342/70 |
| 2015/0228066 A1 | 8/2015 | Farb | |
| 2016/0274232 A1* | 9/2016 | Schiffmann | G01S 7/415 |
| 2017/0008517 A1* | 1/2017 | Himi | B60W 50/14 |
| 2017/0282915 A1* | 10/2017 | Kim | G01S 13/931 |
| 2017/0307749 A1* | 10/2017 | Shimizu | G08G 1/166 |
| 2018/0120842 A1* | 5/2018 | Smith | G01S 7/412 |
| 2018/0341012 A1* | 11/2018 | Takada | G01S 7/414 |
| 2019/0018133 A1* | 1/2019 | Takada | G01S 13/56 |
| 2019/0317204 A1* | 10/2019 | Zhang | G01S 13/89 |
| 2019/0329794 A1* | 10/2019 | Kim | B60W 30/0953 |
| 2020/0278435 A1* | 9/2020 | Wang | G01S 13/66 |
| 2020/0307560 A1* | 10/2020 | Shin | G01S 13/931 |
| 2021/0104027 A1* | 4/2021 | Longman | G06T 5/009 |
| 2021/0192235 A1* | 6/2021 | Bolduc | G01S 7/487 |
| 2022/0163649 A1* | 5/2022 | Li | G01S 7/354 |

FOREIGN PATENT DOCUMENTS

| | | |
|---|---|---|
| JP | 2008-120228 A | 5/2008 |
| JP | 2008-304344 A | 12/2008 |
| JP | 2009-74804 A | 4/2009 |
| JP | 2009-133761 A | 6/2009 |
| JP | 2017-96840 A | 6/2017 |
| JP | 2017-187422 A | 10/2017 |

OTHER PUBLICATIONS

Chinese Office Action dated Jul. 27, 2022, in counterpart Chinese Patent Application No. 202110558504.5 (11 Pages in Chinese).
KIPO Office Action dated Jun. 4, 2021 in counterpart Korean patent application No. 10-2020-0061847 (4 pages in Korean).

* cited by examiner

METHOD AND APPARATUS FOR REAR CROSS COLLISION WARNING

CROSS REFERENCE TO RELATED APPLICATION

This application claims the benefit under 35 U.S.C. § 119(a) of Korean Patent Application No. 10-2020-0061847 filed on May 22, 2020 in the Korean Intellectual Property Office, the entire disclosure of which is incorporated herein by reference for all purposes.

BACKGROUND

1. Technical Field

The present invention relates to a method and apparatus for rear cross collision warning, and more specifically, to a method and apparatus for rear cross collision warning capable of preventing a false warning generated by a detection of a ghost tracking target as radar signals are reflected back from reflective structures.

2. Description of the Related Art

A system for viewing, and warning against, an obstacle or object with a radar module mounted in a rear side portion of a vehicle is adopted recently.

In particular, a rear cross collision warning (RCCW) system tracks a target moving in the rear of a vehicle through a radar module mounted in a rear side portion of the vehicle when the vehicle moves backward, and warns when the tracking target approaches the vehicle within a certain range.

The rear cross collision warning system developed in the conventional art has a problem that a false warning against a target approaching in the lateral direction of the vehicle is generated. Such a false warning is generated when the radar module detects a ghost tracking target by sensing radar signals reflected back from structures existing around the vehicle.

In particular, as the frequency of the radar signal adopted in the rear side radar system is raised higher to increase sensing distance or speed resolution in recent years, occurrence of a false target tracking is all the more likely, and accordingly, the likelihood of a false warning in the rear cross collision warning system is also rising.

The matters described as the background art are only for enhancing an understanding of the background of the present invention, and should not be taken as acknowledging that they correspond to the prior art already known to those of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a method with rear cross collision warning includes: dividing a surrounding area of a host vehicle into a plurality of cells arranged in lateral and longitudinal directions; creating a grid map on which cells, among the plurality of cells, corresponding to positions where a stationary object around the host vehicle is viewed are classified as occupied cells; determining a position of a reflective structure reflecting radar signals based on a positional relationship between the occupied cells on the grid map; and determining, based on the determined position of the reflective structure and either one of a position of a tracking target viewed by the radar and moving direction of the tracking target, whether the tracking target is a ghost tracking target.

The creating of the grid map may include classifying cells corresponding to points where the stationary object is viewed by radar as the occupied cells.

The creating of the grid map may include classifying the cells corresponding to the positions where stationary object is viewed as occupied cells, in response to radar maintaining viewing rates equal to or higher than a predetermined reference viewing rate during a predetermined reference viewing cycle, or in response to a magnitude of signals received by the radar being equal to or greater than a predetermined threshold.

The determining of the position of the reflective structure may include determining that the occupied cells represent one reflective structure, in response to a distance between the occupied cells in a column of the grid map being within a predetermined threshold distance, and concluding that two end cells among the occupied cells determined to represent the one reflective structure are a start occupied cell and an end occupied cell, respectively, of the one reflective structure.

The determining of whether the tracking target is the ghost tracking target may include determining that the tracking target is the ghost tracking target, in response to the tracking target moving toward the position of the reflective structure.

The determining of whether the tracking target is the ghost tracking target may include determining that the tracking target is the ghost tracking target, in response to a lateral position of the tracking target being farther away from the host vehicle than a lateral position of the reflective structure is, a magnitude of a lateral positional change of the tracking target being directed in a direction toward the host vehicle, and a longitudinal position of the tracking target falling between a start point and an end point of the reflective structure.

The determining of whether the tracking target is the ghost tracking target may include determining that the tracking target is the ghost tracking target, in response to a lateral position of the tracking target being farther away from the host vehicle than a lateral position of the reflective structure is, a magnitude of a lateral positional change being directed in a direction toward the host vehicle, and a straight line representing a moving path of the tracking target crossing the position of the reflective structure.

The determining of whether the tracking target is the ghost tracking target may include determining that the tracking target is the ghost tracking target, in response to a lateral position of the tracking target falling between the position of the reflective structure and a position of the host vehicle, a lateral positional change of the tracking target being directed in a direction toward host vehicle, and a lateral acceleration of the tracking target being greater than a reference acceleration that is calculated in physical terms in a condition in which the tracking target starts moving in a stationary state from the position of the reflective structure.

In another general aspect, an apparatus with rear cross collision warning includes: a radar configured to view an object in a surrounding area of a host vehicle; and a controller. The controller is configured to: divide a surrounding area of the host vehicle into a plurality of cells in lateral and longitudinal directions, and create a grid map on which cells, among the plurality of cells, corresponding to positions where a stationary object around the host vehicle is viewed are classified as occupied cells; determine a position of a reflective structure reflecting radar signals of the radar, based on a positional relationship between the occupied cells on the grid map; and determine, based on the determined position of the reflective structure and either one of a position of a tracking target viewed by the radar and a moving direction of the tracking target, whether the tracking target is a ghost tracking target.

The controller may include: a grid map creator configured to divide the surrounding area of the host vehicle into the plurality of cells in the lateral and longitudinal directions, and create the grid map on which the cells corresponding to the position where the stationary object around the host vehicle is viewed are classified as the occupied cells; a reflective structure determiner configured to determine the position of the reflective structure reflecting the radar signals, based on the positional relationship between the occupied cells on the grid map; and a ghost tracking target determiner configured to determine, based on the determined position of the reflective structure and either one of the position of the tracking target and the moving direction of the tracking target, whether the tracking target is the ghost tracking target.

The grid map creator may be further configured to classify cells corresponding to points where the stationary object is viewed by the radar as occupied cells.

The grid map creator may be further configured to classify the cells corresponding to the positions where the stationary object is viewed as the occupied cells, in response to the radar maintaining viewing rates equal to or higher than a predetermined reference viewing rate during a predetermined viewing cycle, or in response to a magnitude of signals received by the radar being equal to or greater than a predetermined threshold.

The reflective structure determiner may be further configured to determine that the occupied cells represent one reflective structure, in response to a distance between the occupied cells in a column of the grid map being within a predetermined threshold distance, and conclude that two end cells among the occupied cells determined to represent the one reflective structure are a start occupied cell and an end occupied cell, respectively, of the one reflective structure.

The ghost tracking target determiner may be further configured to determine that the tracking target is the ghost tracking target, in response to the tracking target moving toward the position of the reflective structure.

The ghost tracking target determiner may be further configured to determine that the tracking target is the ghost tracking target, in response to a lateral position of the tracking target being farther away from the host vehicle than a lateral position of the reflective structure is, a magnitude of a lateral positional change of the tracking target being directed in a direction toward the host vehicle, and a longitudinal position of the tracking target falling between a start point and an end point of the position of the reflective structure.

The ghost tracking target determiner may be further configured to determine that the tracking target is a ghost tracking target, in response to a lateral position of the tracking target being farther away from the host vehicle than a lateral position of the reflective structure is, a magnitude of the lateral positional change of the tracking target being directed in a direction toward the host vehicle, and a straight line representing a moving path of the tracking target crossing the position of the reflective structure.

The ghost tracking target determiner may be further configured to determine that the tracking target is the ghost tracking target, in response to a lateral position of the tracking target falling between the position of the reflective structure and a position of the host vehicle, a lateral positional change of the tracking target being directed in a direction toward the host vehicle, and a lateral acceleration of the tacking target being greater than a reference acceleration that is calculated in physical terms in a condition in which the tracking target starts moving in a stationary state from the position of the reflective structure.

Other features and aspects will be apparent from the following detailed description, the drawings, and the claims.

DETAILED DESCRIPTION OF THE EMBODIMENTS

Rear cross collision warning methods and apparatuses according to various embodiments will be described in detail with reference to the drawings in the following.

Figure 1:
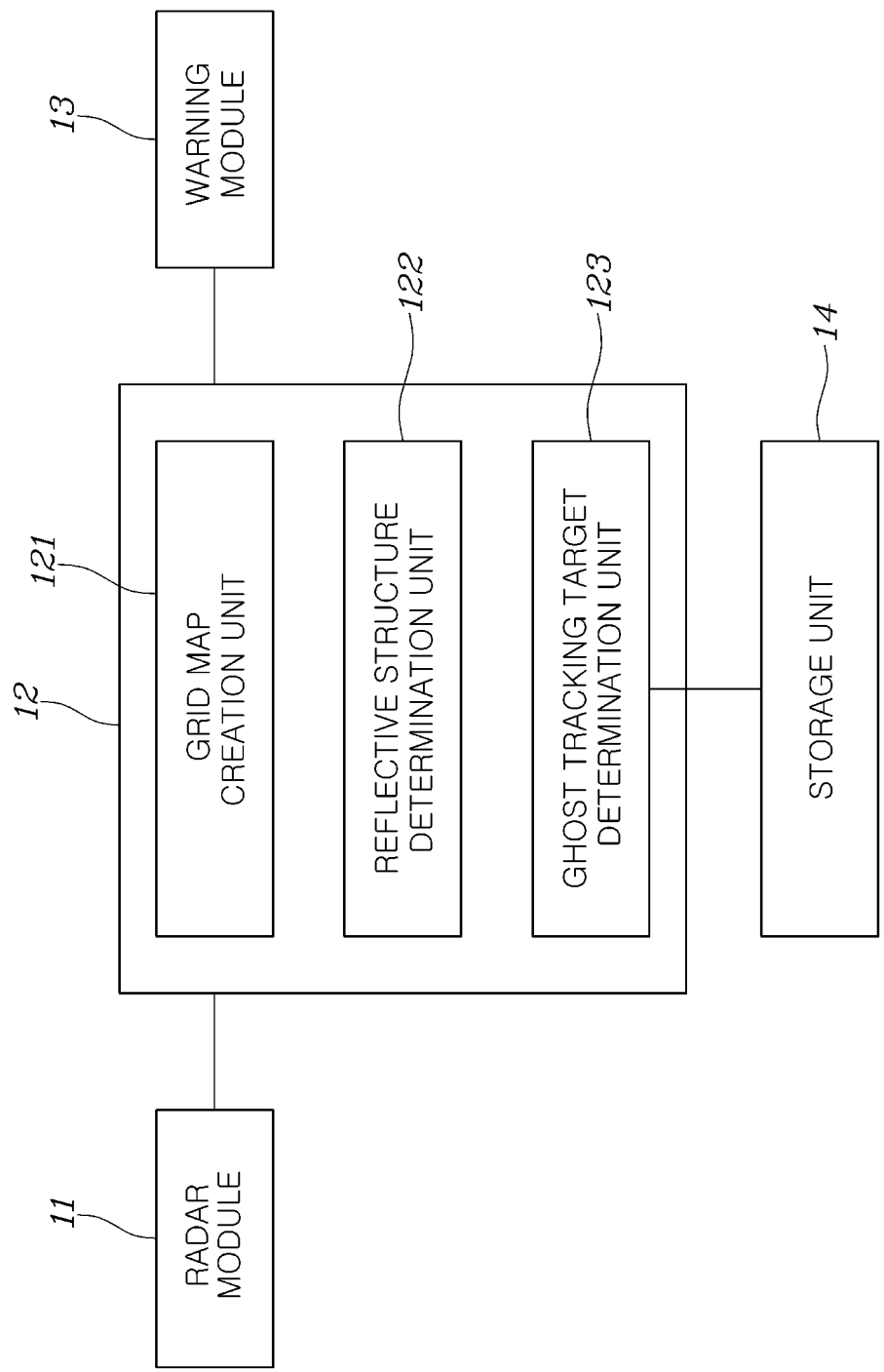
FIG. 1 is a block diagram showing a rear cross collision apparatus according to an embodiment of the present invention.

FIG. 1 is a block diagram showing a rear cross collision warning apparatus according to an embodiment of the present invention.

FIG. 1 shows that the rear cross collision warning apparatus 12 may be configured to comprise a grid map creation unit 121 dividing an area around a vehicle into a plurality of cells arranged in lateral and longitudinal directions and marking cells corresponding to a position where a stationary object exists based on the radar viewing information, a reflective structure determination unit 122 determining the position of the reflective structure based on the marked cells on the grid map which correspond to the position where the stationary structure exits, and a ghost tracking target determination unit 123 determining whether a tracking target is a ghost tracking target based on the determined position of the reflective structure and a moving direction or moving velocity of the tracking target viewed by the radar module 11.

As is known in the related art, the rear cross collision warning apparatus may monitor the movement of the tracking target viewed by the radar module 11 and warn through a warning module 13 when the tracking target approaches the vehicle within a predetermined distance.

The grid map creation unit 121, the reflective structure determination unit 122, and the ghost tracking target determination unit 123 described above may be provided in the control unit 12 for controlling the operations of the rear cross collision warning apparatus or may be implemented in the form of algorithms for performing the corresponding functions. Of course, the control unit 12 may also include an algorithm for performing the operations of processing and calculating the routine radar viewing signals and determining whether to warn.

Additionally, a storage unit 14 provided in the rear cross collision warning apparatus may be provided for storing processed data in a program for implementing algorithms performed in the control unit 12 or respective algorithm.

Figure 2:
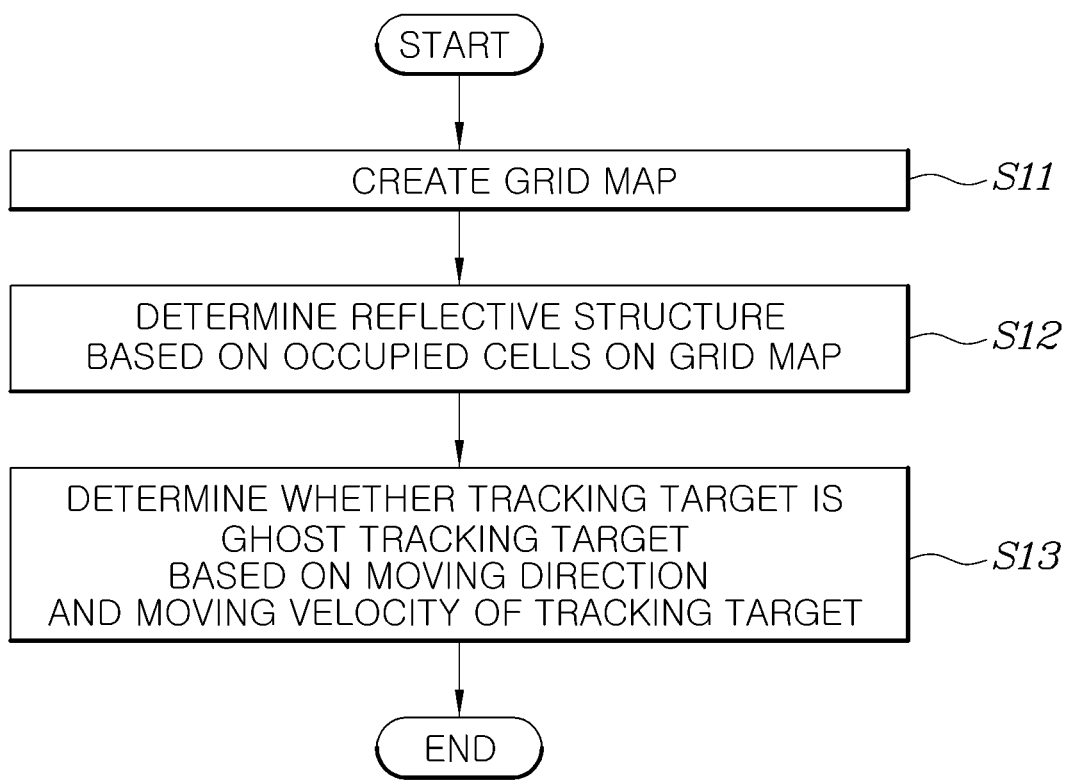
FIG. 2 is a flowchart showing a rear cross collision warning method according to an embodiment of the present invention.

FIG. 2 is a flowchart showing a rear cross collision warning method according to an embodiment of the present invention.

The rear cross collision warning method according to the embodiment of the present invention may be implemented by the rear cross collision warning apparatus described above and may be performed by the operations of the grid map creation unit 121, the reflective structure determination unit 122, and the ghost tracking target determination unit 123 in order.

As shown in FIG. 2, the rear cross collision warning method according to an embodiment of the present invention may be configured to include a step S11 where the grid map creation unit 121 expresses a surrounding area of a host vehicle with a plurality of cells separated in the lateral and longitudinal directions and marks to classify the cells corresponding to the position where the stationary object viewed by the radar module 11 exists as occupied cells, a step S12 where the reflective structure determination unit 122 determines the position of the reflective structure reflecting radar signals based on the positional relationship between the occupied cells marked on the grid map, and a step S13 where whether the tracking target is the ghost tracking target is determined based on the position of the reflective structure and the moving direction and moving velocity of the tracking target viewed by the radar module 11.

In the following, detailed operations of the rear cross collision warning apparatus and method according to an embodiment of the present invention shown in FIGS. 1 and 2 will be described with examples of diverse environments in which the ghost tracking target may occur.

Figure 3:
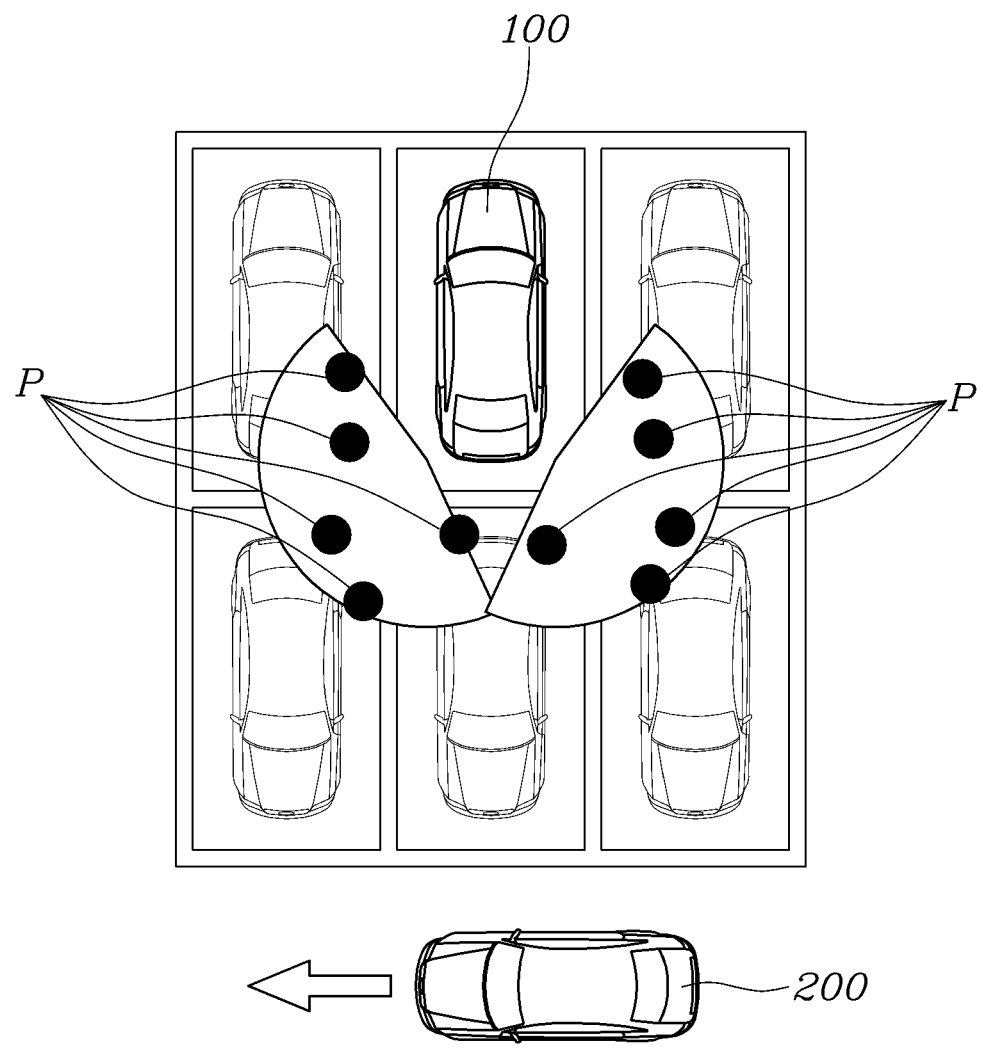
FIG. 3 is a diagram showing a first example in which a ghost tracking target may occur by a rear cross collision warning apparatus and method.

FIG. 3 is a diagram showing a first example in which a ghost tracking target may occur by the rear cross collision warning apparatus and method.

The example shown in FIG. 3 presents a case where a vehicle 200 moving in the lateral direction exist in the rear of vehicles parked in the rear of the host vehicle 100 in a parking lot where vehicles are parked on the right and left sides, and in the rear, of a host vehicle 100.

In the example shown in FIG. 3, radar signals are reflected among the vehicles parked in the rear, and on the rear side, of the host vehicle 100, so that the rear cross collision warning system falsely senses a vehicle moving in the rear of the host vehicle even when no moving vehicle actually exists in the rear of the host vehicle 100.

First, the rear cross collision warning system provided in the host vehicle 100 views other parked vehicles through the rear side radar module 11. Reference numeral "P" in FIG. 3 indicates viewing points of the other parked vehicles in a neighborhood viewed by the rear side radar module 11 of the host vehicle.

Figure 4:
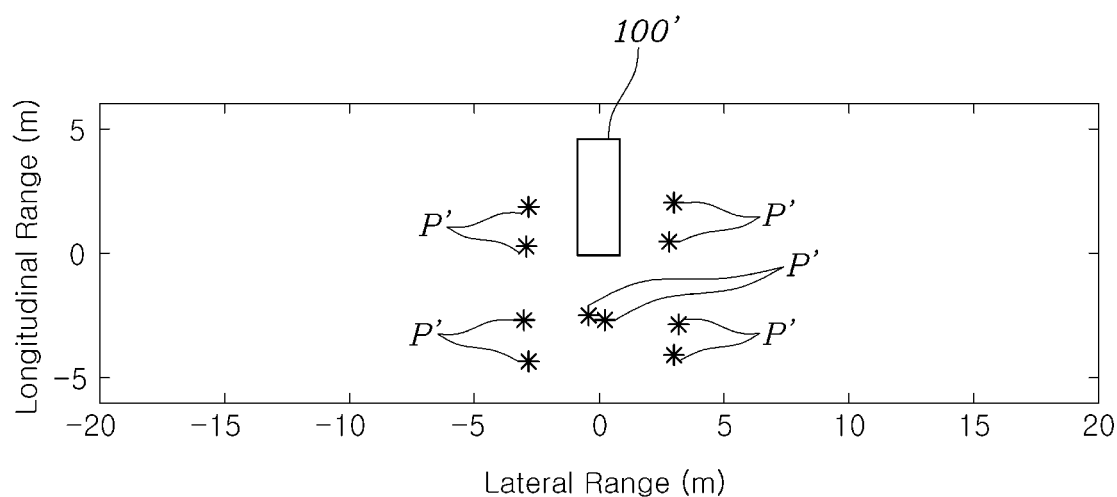
FIG. 4 is a graph showing a positional relationship between viewing points viewed by a radar module and a vehicle in the example shown in FIG. 3.

FIG. 4 is a graph showing a positional relationship between the host vehicle and the viewing points viewed by the radar module in the example shown in FIG. 3.

As shown in FIG. 4, the position 100' of the host vehicle and the position P' of the viewing points may be marked on the graph. In the graph shown in FIG. 4, the center of the rear of the host vehicle 100' becomes the origin and the position P' of the viewing points may be marked with respect to the axis passing in the longitudinal direction, and the axis passing in the lateral direction, through the origin.

Figure 5:
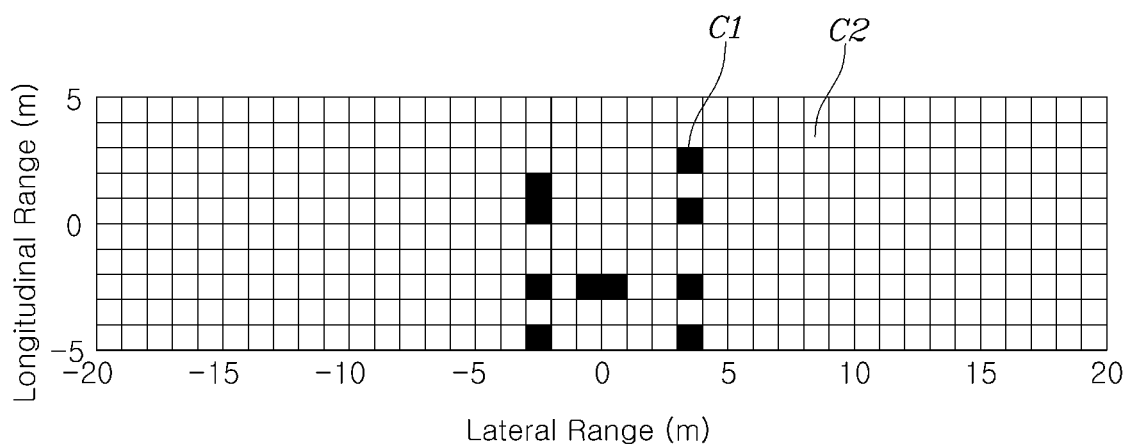
FIG. 5 is a diagram showing an example of a grid map created from the graph shown in FIG. 4.

FIG. 5 is a diagram showing an example of a grid map created from the graph shown in FIG. 4.

As shown in FIG. 5, in the step S11 where the grid map is created, the grid map creation unit 121 may express the surrounding area of the host vehicle with a plurality of cells C1 and C2 separated in the lateral and longitudinal directions of the host vehicle.

In the step S11 where the grid map is created, the grid map creation unit 121 may express the surrounding area of the host vehicle with a plurality of cells separated in the lateral and longitudinal directions, and then, mark the positions corresponding to the points denoted by P or P' where the stationary object is viewed by the radar module 11 as occupied cells C1 and other positions not corresponding to the points P or P' as unoccupied cells C2.

In the process of marking the occupied cell C1, the grid map creation unit 121 may only mark cells as occupied cells as long as the viewing rates are maintained equal to or higher than a predetermined reference viewing rate during a predetermined reference viewing cycle or the magnitude of signals received by the radar module is equal to or greater than a predetermined threshold.

This is to further improve the mapping performance of making the occupied cell C1. In general, since the radar signal characteristics (bandwidth, dwell time, center frequency, and the like) of a radar used for each viewing cycle vary, viewing tendency (distance resolution and speed resolution) may vary as well. For this reason, the stationary object information viewed during each viewing cycle may vary in the same environment. Accordingly, that the viewing rates equal to or higher than a certain viewing rate are maintained during a certain cycle implies a very high probability that a stationary object exists at the corresponding position.

Also, since beam width with respect to the mounting position and vertical angle of the radar module 11 may cause the ground (floor) to be viewed as a stationary object, the corresponding cell may only be marked as an occupied cell as long as the magnitude of signals received by the radar module is equal to or greater than a predetermined threshold so as to filter out the ground viewing information with relatively small values.

Figure 6:
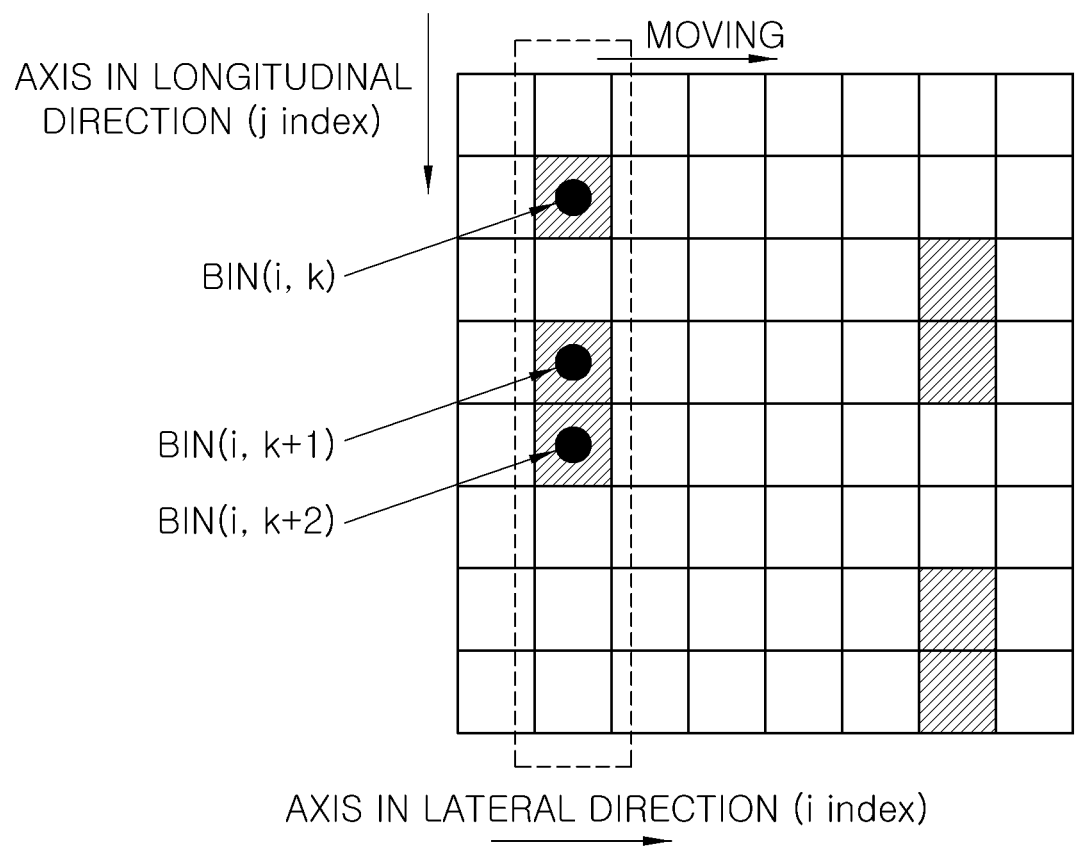
FIG. 6 is an exemplary diagram for describing a process of determining a position of a reflective structure by using a grid map in a rear cross collision warning method and apparatus according to an embodiment of the present invention.

FIG. 6 is an exemplary diagram to describe a process of determining a position of a reflective structure by using a grid map in a rear cross collision warning method and apparatus according to an embodiment of the present invention.

In the step S12 where the position of the reflective structure is determined, the reflective structure determination unit 122 may identify positions of occupied cells in longitudinal direction for each column of the grid map and determine the reflective structure based on the distance between the occupied cells.

More specifically, as shown in FIG. 6, when the longitudinal distance between the k-th occupied cell (BIN(i, k)) and the k+1-th occupied cell (BIN(i, k+1)) in the i-th column is equal to or less than a predetermined threshold, the reflective structure determination unit 122 may determine the two occupied cells represent one structure.

That is, when the distance between the occupied cells in each column of the grid map is within a predetermined threshold, the reflective structure determination unit 122 may determine that the cells correspond one reflective structure and conclude that the two ends of the occupied cells determined to correspond to the one reflective structure are a start occupied cell and an end occupied cell of the corresponding reflective structure.

Such reflective structure determination may be performed for each column of the grid map.

Figure 7:
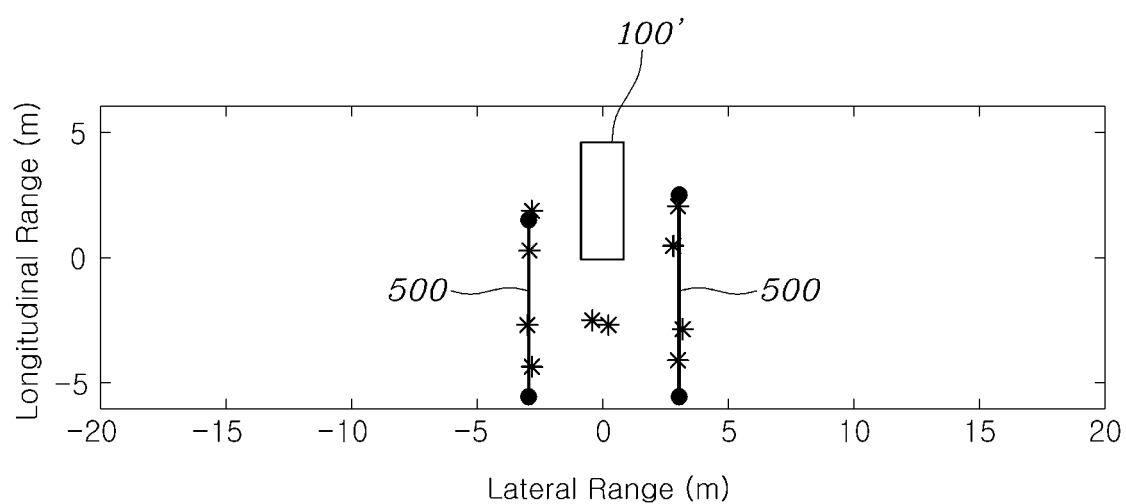
FIG. 7 is a graph showing a position of a reflective structure derived from the grid map shown in FIG. 5.

FIG. 7 is a graph showing the position of the reflective structure derived from the grid map shown in FIG. 5.

As shown in FIG. 7, the reflective structure determination unit 122 may determine the position 500 of the reflective structure based on the positional relationship between the occupied cells in each column (parallel to the longitudinal direction) on the grid map shown in FIG. 5. It may be confirmed that the straight lines identified as the positions 500 of the reflective structures, determined in the same process as the processes shown in FIGS. 3, 4, 5, and 7, correspond to the sides of the vehicles parked around the host vehicle 100'.

Figure 8:
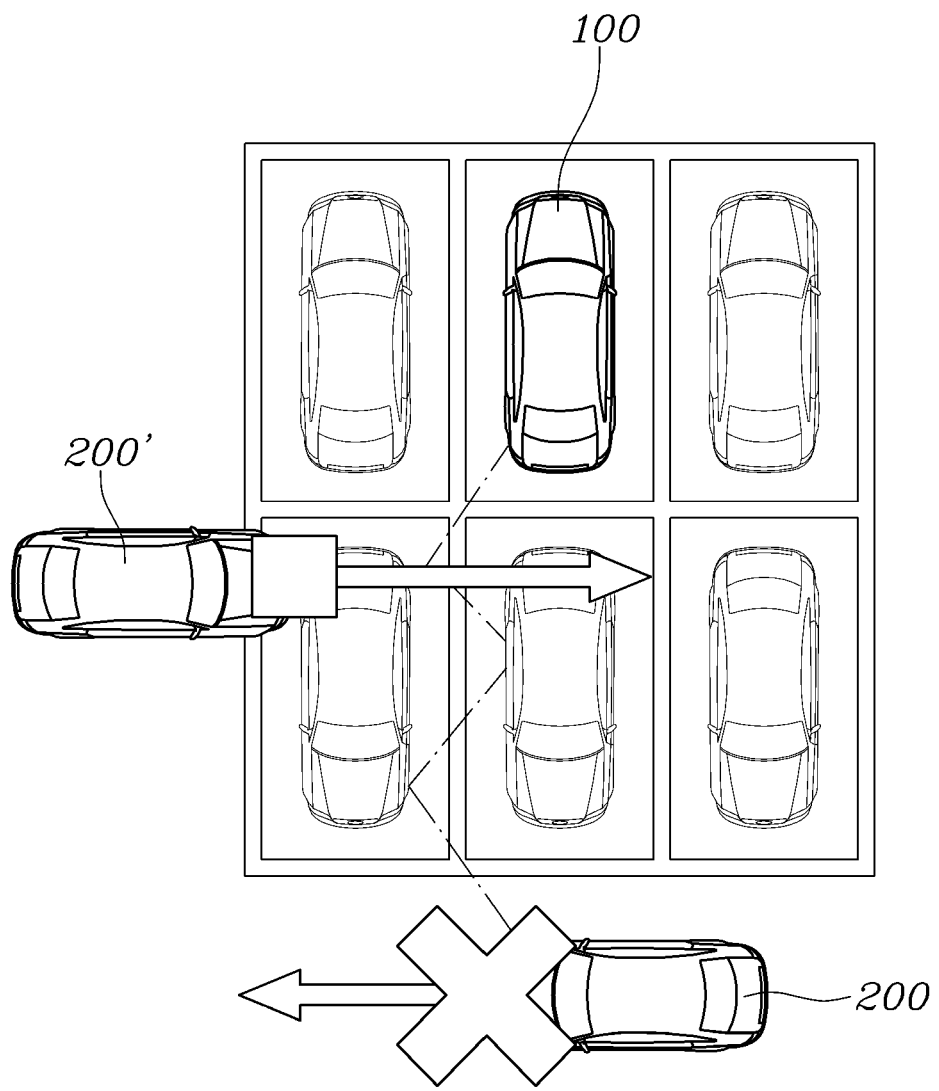
FIG. 8 is a diagram showing an example a ghost tracking target occurring in the example shown in FIG. 3.

FIG. 8 is a drawing showing an example of a ghost tracking target occurring in the example shown in FIG. 3.

In the situation shown in FIG. 8, another vehicle 200 actually moving in the lateral direction poses no danger to the host vehicle actually moving backward. However, reflection of the radar signals from other parked vehicles may cause the radar module mounted in the host vehicle to falsely sense the other vehicle 200 approaching the rear of the host vehicle very closely. Here, the reference numeral 200' indicates the position where a ghost tracking target generated by reflection is sensed.

Figure 9:
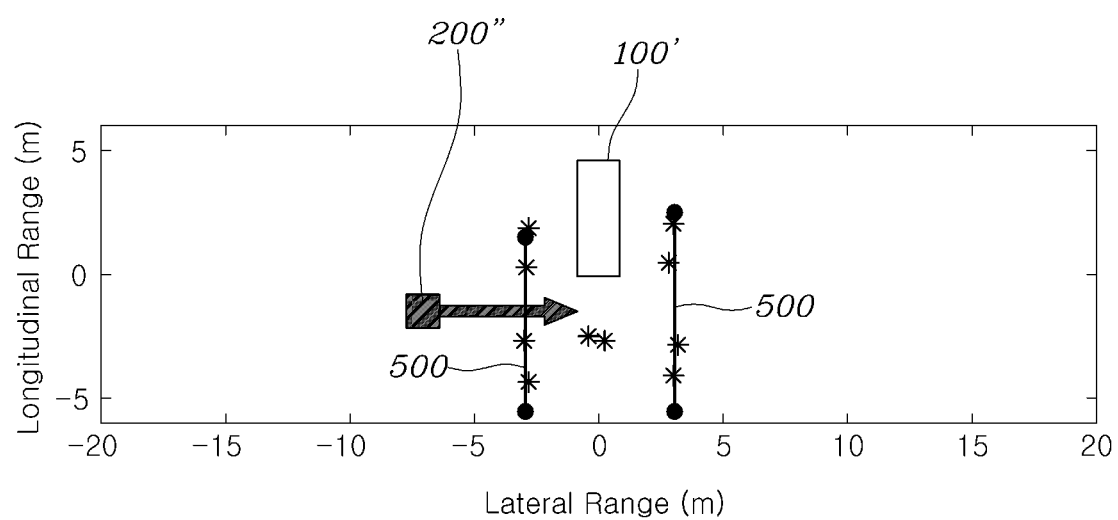
FIG. 9 is a diagram showing a moving path of a ghost tracking target occurring in the situation shown in FIG. 8.

FIG. 9 is a drawing showing the moving path of the ghost tracking target occurring in the situation shown in FIG. 8.

In the step S13 where the ghost tracking target is determined, the ghost tracking target determination unit 123 may determine whether the tracking target viewed by the radar module is the ghost tracking target based on the position 500 of the reflective structure and the moving direction of the tracking target.

In the examples shown in FIGS. 8 and 9, the tracking targets 200' and 200" move toward the reflective structure 500. Almost no target moves toward a particular structure in reality and it is impossible to get to the host vehicle, even if the target moves toward the particular structure. Accordingly, when the tracking targets 200' and 200" move toward the reflective structure 500, the tracking targets may be determined to be ghost tracking targets.

In the step S12 where the reflective structure is determined, since the coordinates of the start point and the end point of the reflective structure are already decided and the positional information of the tracking target may be viewed by the radar module 11, a simple calculation makes it possible to determine whether the tracking target moves toward the reflective structure.

For example, in the example shown in FIGS. 8 and 9, when the lateral position of the tracking target is farther away from the host vehicle than the lateral position of the reflective structure is, the lateral positional change (lateral velocity) of the tracking target is directed in the direction of the host vehicle, and the longitudinal position of the tracking target falls between the start point and the end point of the reflective structure, the tracking target may be determined to be the ghost tracking target.

More specifically, when the lateral position of the tracking target is farther away from the host vehicle than the lateral position of the reflective structure is and the lateral positional change (lateral velocity) of the tracking target is directed in the direction of the host vehicle, the tracking target may be determined to be a ghost tracking target based on the determination on whether a straight line representing the moving path of the tracking target and a straight line representing the reflective structure cross each other, the former straight line being obtained from the slope and the intercept of a first-order formulation which represents the moving path of the tracking target.

Figure 10:
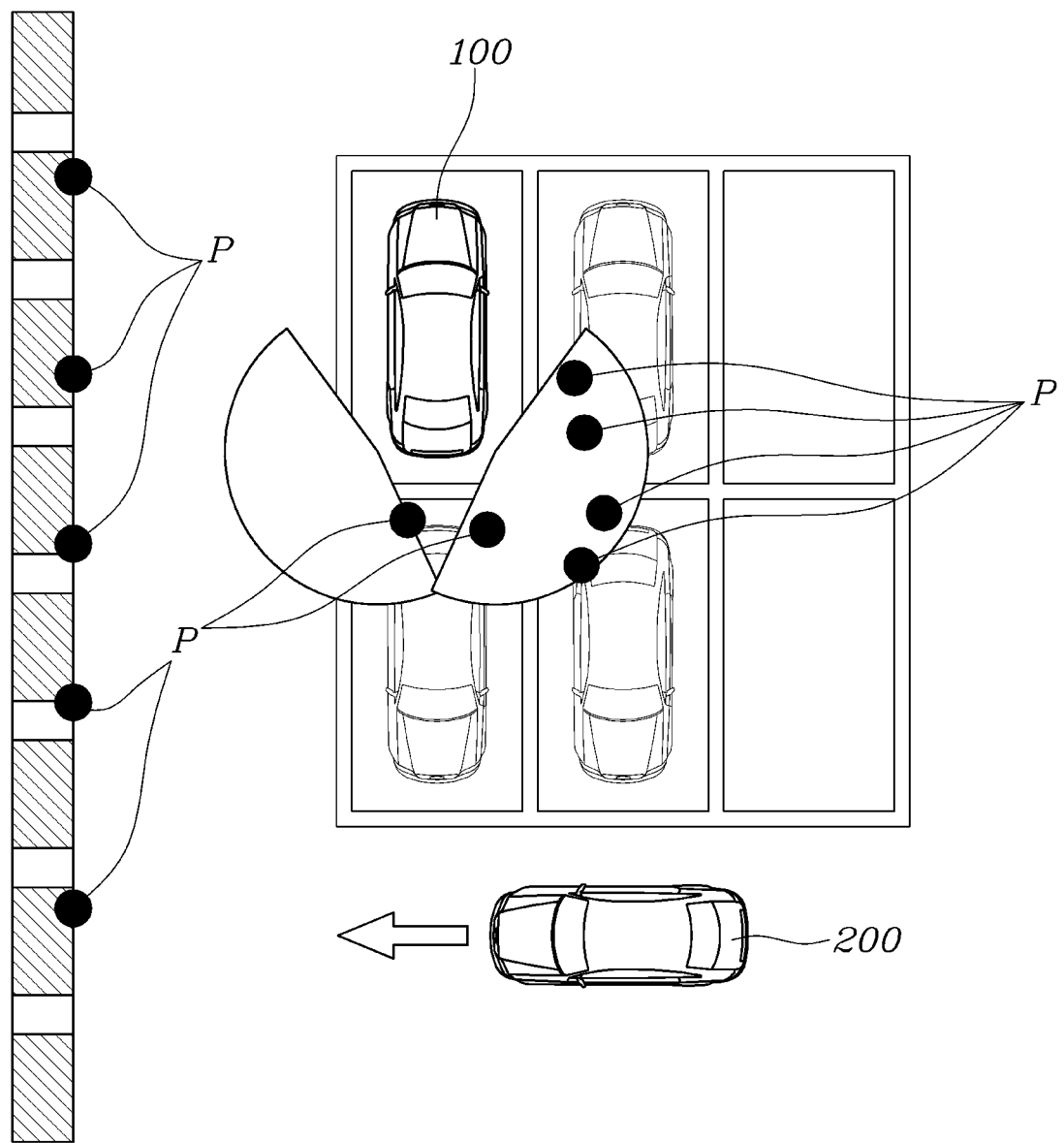
FIG. 10 is a diagram showing a second example in which a ghost tracking target may occur by a rear cross collision warning apparatus and method.

FIG. 10 is a diagram showing a second example in which the ghost tracking target occurs by the rear cross collision warning apparatus and method.

In the example of FIG. 10, vehicles are parked in the rear, and on the right and rear right sides, of the host vehicle and a wall, spaced apart from the host vehicle, stands on the left of the host vehicle. Also in FIG. 10, the reference numeral "P" indicates viewing points of the vehicles viewed by the rear side radar module 11.

Figure 11:
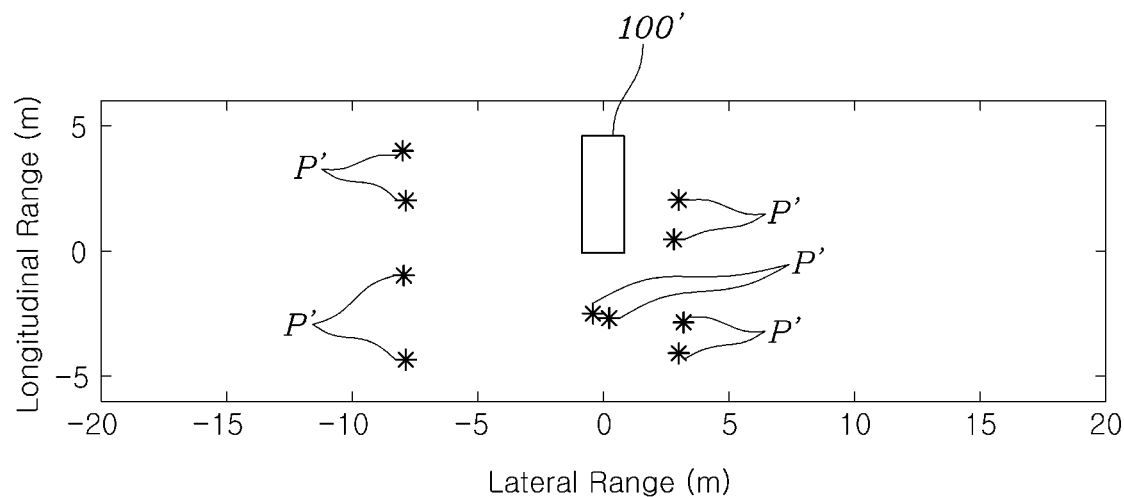
FIG. 11 is a graph showing a positional relationship between a viewing point viewed by a radar module and a vehicle in the example shown in FIG. 10.

FIG. 11 is a graph showing a positional relationship, shown in FIG. 10, between the viewing points viewed by the radar module and the host vehicle on the graph.

As shown in FIG. 11, the position 100' of the host vehicle and the position P' of the detection points may be marked on the graph. In the graph shown in FIG. 11, the position P' of the viewing points may be marked with the center of the rear surface of the host vehicle as the origin, based on an axis passing in the longitudinal direction, and the axis passing in the lateral direction, through the origin.

Figure 12:
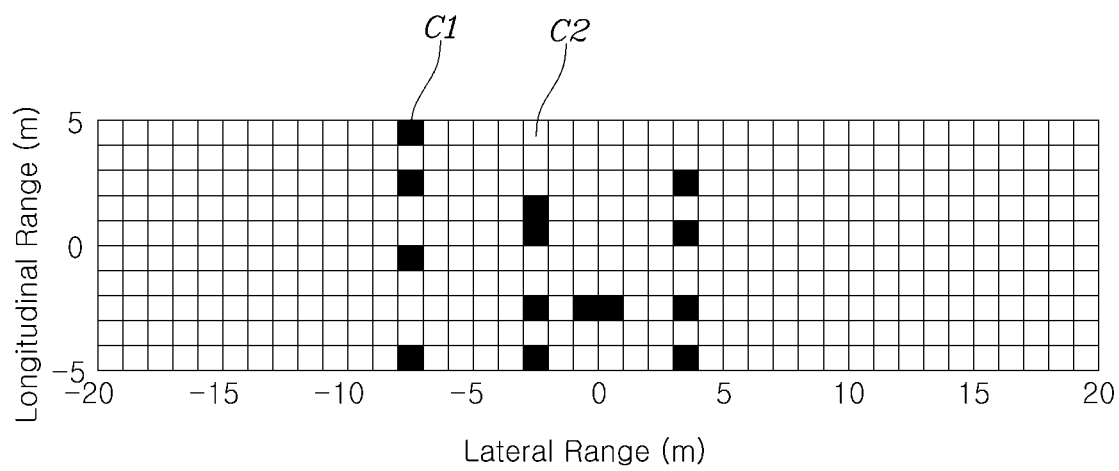
FIG. 12 is a diagram showing an example of a grid map created from the graph shown in FIG. 11.

FIG. 12 is a diagram showing an example of a grid map created from the graph shown in FIG. 11.

As shown in FIG. 12, in the step S11 where the grid map is created, the grid map creation unit 121 may express the surrounding area of the host vehicle with a plurality of cells C1 and C2 separated in the lateral and longitudinal directions of the host vehicle. The size of each cell on the grid map may be appropriately determined as needed. Preferably, the cell may have a square shape and the length of one side of the square may be set in advance to a length suitable for calculation of the positional relationship in consideration of the resolution of the radar module 11 and the like.

In the step S11 where the grid map is created, the grid map creation unit 121 may mark the cells corresponding to the viewing points P of the radar module 11 as occupied cells C1.

Figure 13:
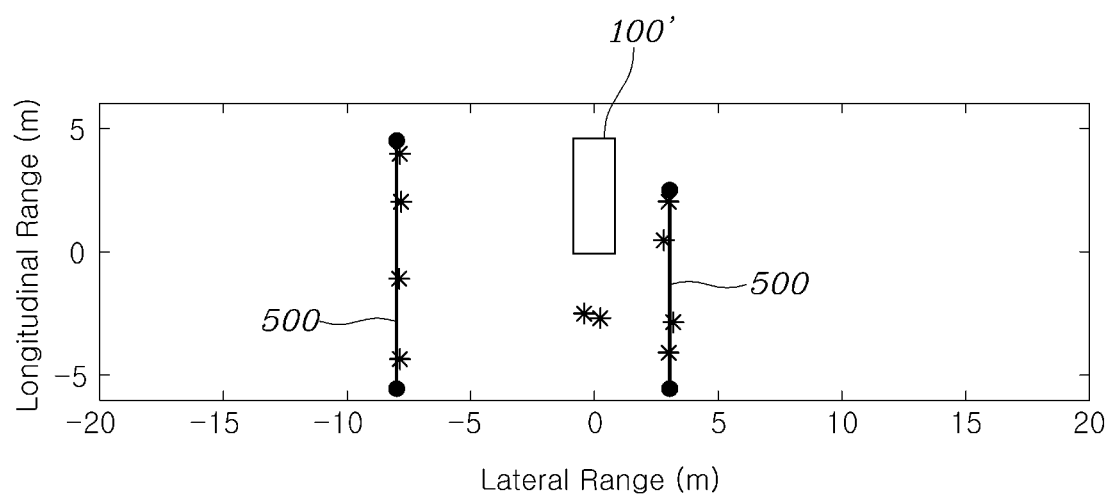
FIG. 13 is a graph showing a position of a reflective structure derived from the grid map shown in FIG. 12.

FIG. 13 is a graph showing a position of a reflective structure derived from the grid map shown in FIG. 12.

As shown in FIG. 13, the reflective structure determination unit 122 may determine the position 500 of the reflective structure based on the positional relationships between the occupied cells in each column (in a direction parallel to the longitudinal axis) on the grid map shown in FIG. 12. Detailed method of determining a position of a reflective structure is the same as the method described in FIG. 6.

Figure 14:
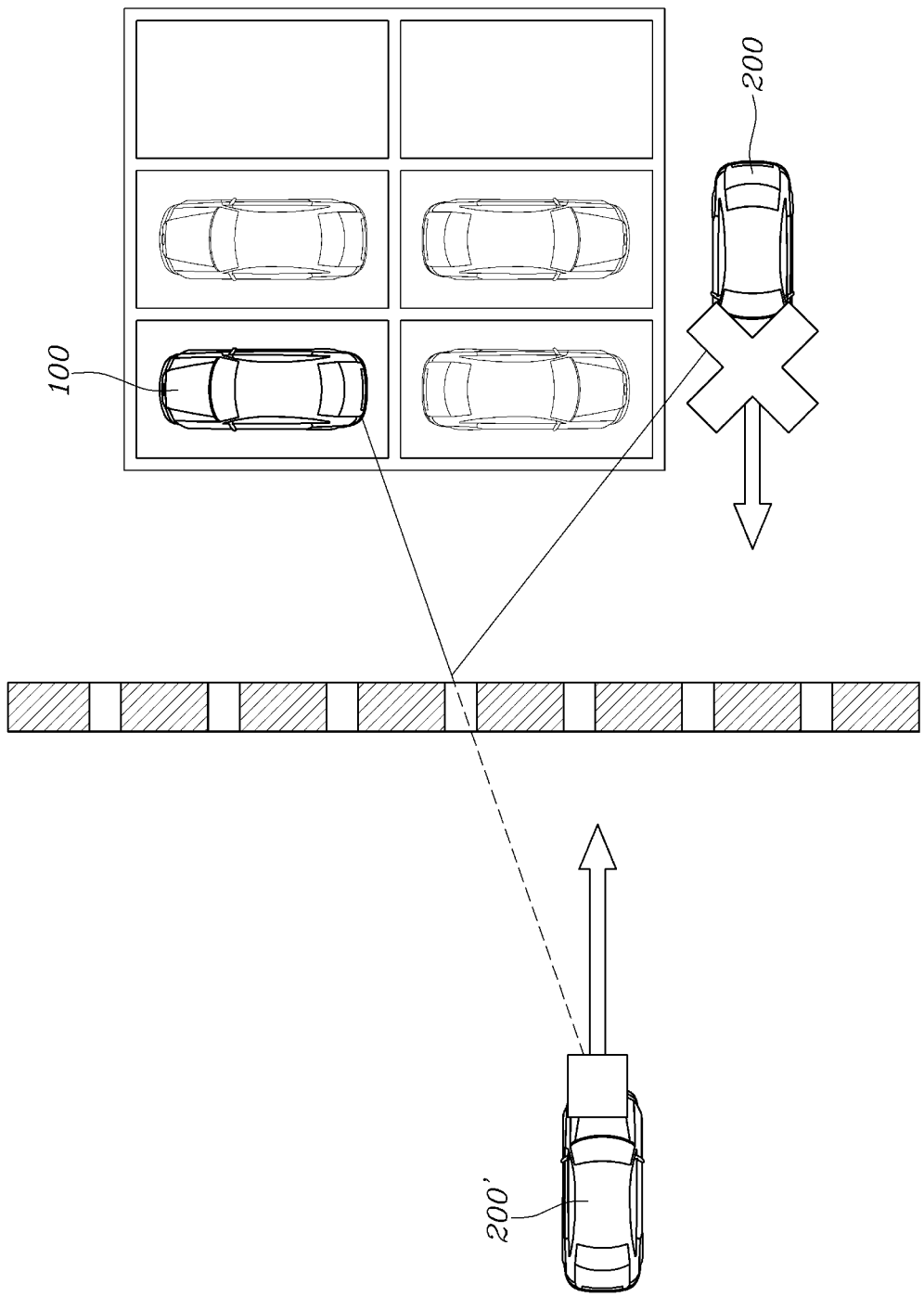
FIG. 14 is a drawing showing a ghost tracking target occurring in the example shown in FIG. 10.

FIG. 14 is a diagram showing an example in which the ghost tracking target occurs in the example shown in FIG. 10.

In the situation shown in FIG. 14, as shown in FIGS. 8 and 9, the vehicle 200 actually moving in the lateral direction poses no danger to the host vehicle actually moving backward, but the reflection of radar signals generated from the reflective structure 500 like the wall may cause the radar module mounted in the host vehicle to falsely sense the vehicle 200 approaching the host vehicle very closely from the rear in the lateral direction. Here, the reference numeral 200' indicates the position where the ghost tracking target generated by the reflection is sensed.

Figure 15:
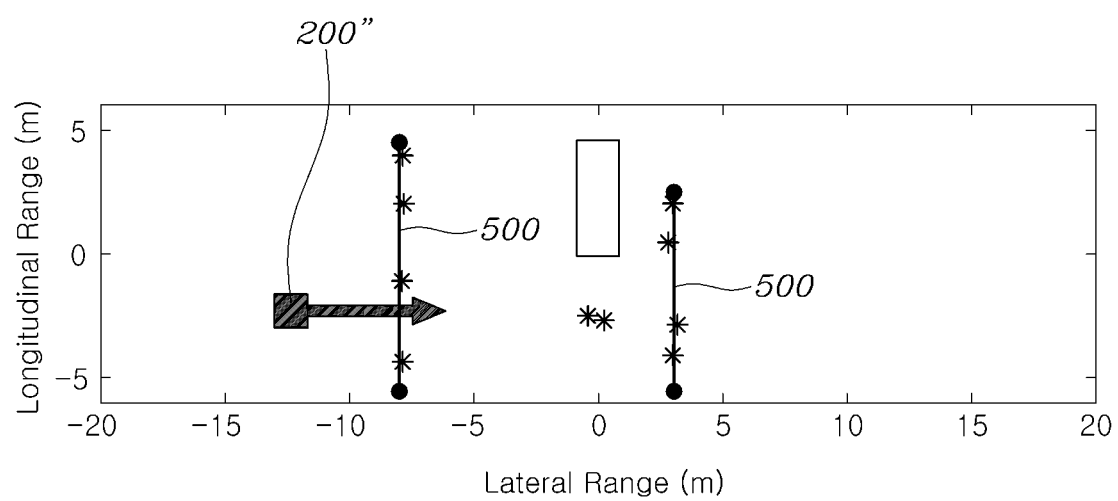
FIG. 15 is a diagram showing on a graph a moving path of a ghost tracking target occurring in the state shown in FIG. 14.

FIG. 15 is a diagram showing on a graph the moving path of the ghost tracking target occurring in the situation shown in FIG. 14.

In the step S13 where the ghost tracking target is determined, the ghost tracking target determination unit 123 may determine whether a tracking target viewed by the radar module is the ghost tracking target based on the position 500 of the reflective structure and the moving direction of the tracking target.

As shown in the example shown in FIGS. 8 and 9, the tracking targets 200' and 200" moving toward the reflective structure 500 may be viewed in the example shown in FIGS. 14 and 15.

Even in this case, when the lateral position of the tracking target is farther away from the host vehicle than the lateral position of the reflective structure is, the magnitude of lateral positional change (lateral velocity) is directed in the direction of the host vehicle and the longitudinal position of the tracking target falls between the start point and the end point of the reflective structure, it may be determined that the corresponding tracking target is the ghost tracking target.

More specifically, when the lateral position of the tracking target is farther away from the host vehicle than the lateral position of the reflective structure is and the lateral positional change (lateral velocity) of the tracking target is directed in the direction of the host vehicle, it may be determined that the tracking target is the ghost tracking target based on the determination on whether the straight line representing the tracking target moving path and the straight line representing the reflective structure cross each other, the former straight line being obtained from the slope and the intercept of a first-order formulation which represents the moving path of the tracking target.

Figure 16:
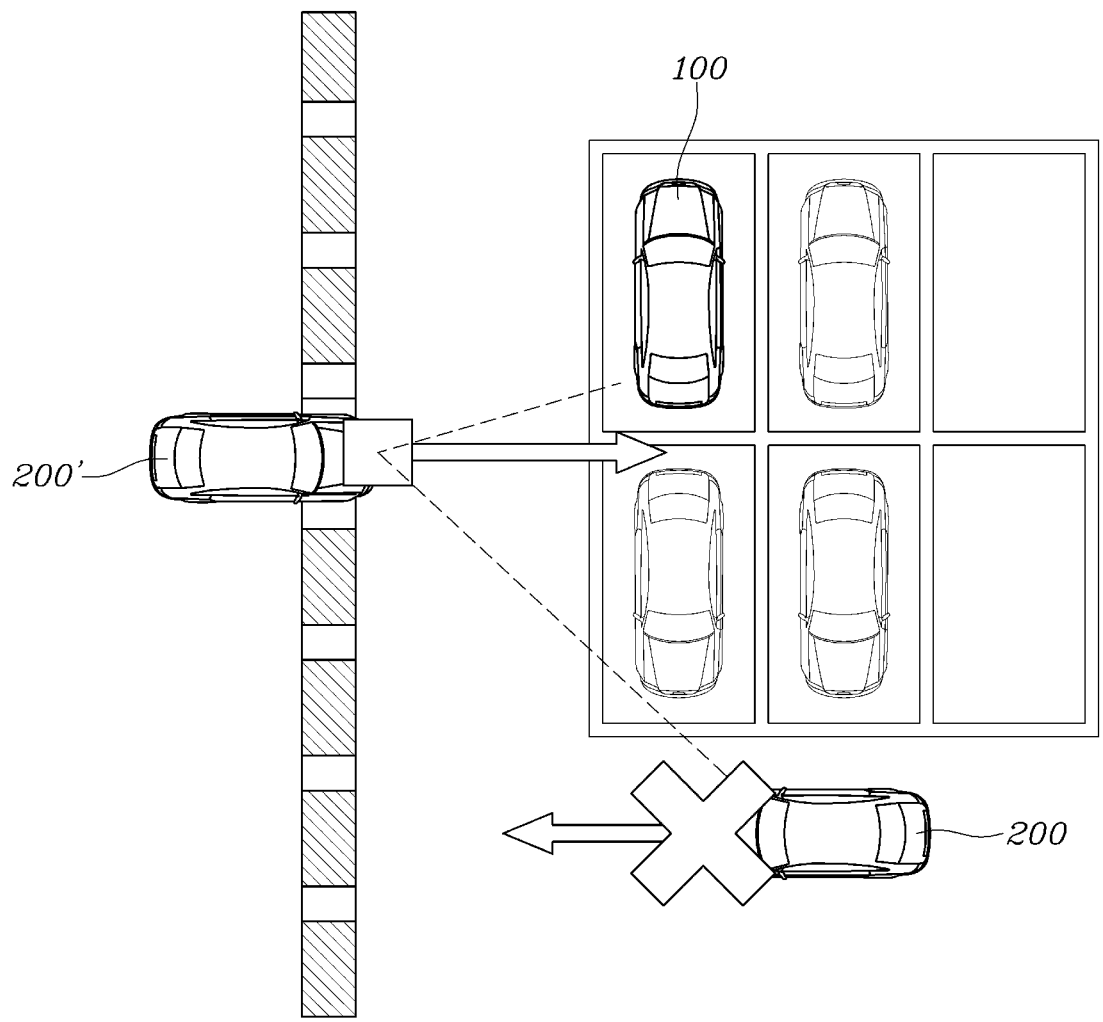
FIG. 16 is a diagram showing another example of a ghost tracking target occurring in the example shown in FIG. 10.
Figure 17:
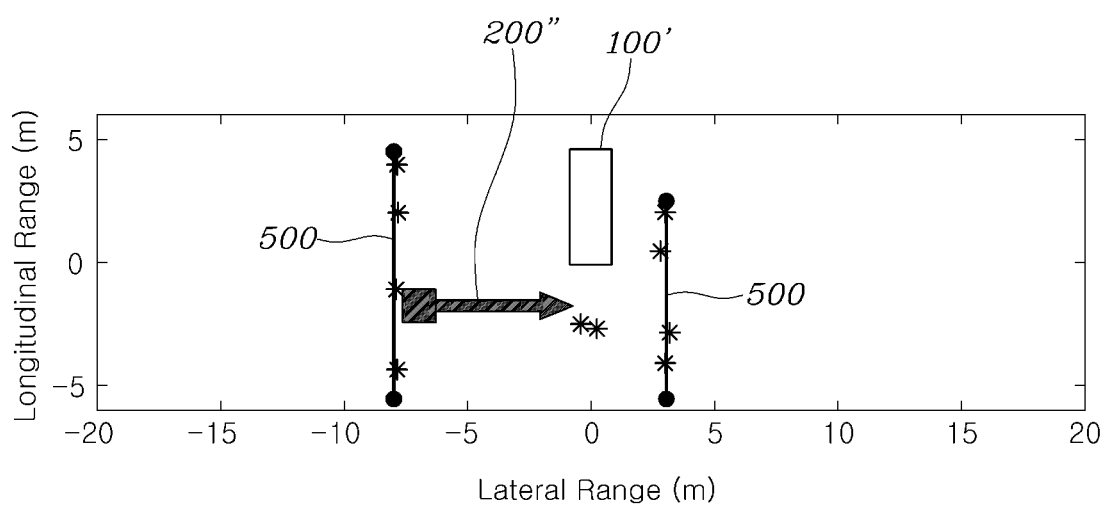
FIG. 17 is a diagram showing on a graph a moving path of a ghost tracking target occurring in the situation shown in FIG. 16.

FIG. 16 is a diagram showing another example in which the ghost tracking target shown in FIG. 10 occurs and FIG. 17 is a diagram showing on a graph the moving path of a ghost tracking target occurring in the situation shown in FIG. 16.

In the situation shown in FIGS. 16 and 17, the radar module 11 may catch the tracking target starting moving from a position very close to the reflective structure.

Since it is impossible in reality for a vehicle to approach the host vehicle at a constant speed without a driving force when a structure is present immediately behind the host vehicle, it is determined in this situation that the ghost tracking target occurred.

In this case, in the step S13 where whether the tracking target is the ghost tracking target is determined, when the lateral position of the tracking target 200" falls between the reflective structure 500 and the host vehicle, and the lateral positional change (lateral velocity) of the tracking target 200" is directed in the direction of the host vehicle, and the lateral acceleration of the tracking target is greater than a reference acceleration that may be calculated in physical terms if the tracking target starts moving in a stationary state from the position of the reflective structure, the ghost tracking target determination unit 123 may determine that the corresponding tracking target is the ghost tracking target.

The lateral acceleration of the tracking target 200" may be easily obtained from the calculation of the magnitude of the lateral velocity change of the tracking target. Also, the reference acceleration may be derived from known moving distance, velocity, and acceleration formulation. When the initial velocity is set to zero, the reference velocity may be calculated from the value of squared velocity of the target 200" divided by the value of double the longitudinal distance between the reflective structure 500 and the tracking target 200".

When it is determined by the ghost tracking target determination unit 123 that the tracking target is the ghost tracking target, the control unit 12 may prevent occurrence of a false warning in the rear cross collision warning system by not generating a warning through a warning module 13.

As described above, according to the rear cross collision warning method and apparatus according to various embodiments of the present invention, the false sensing of the tracking target caused by the reflection of the radar signals from the reflective structure around the host vehicle may be prevented and the robustness of the rear cross collision warning may be secured. In particular, anxiety of a driver may be alleviated and the vehicle merchantability may be improved by preventing an occurrence of the false warning to the driver against rear cross collision.

Specific embodiments of the present invention is illustrated and described, but it will be self-evident to those with common knowledge in the related art that the present invention may be improved and modified in various ways within the scope not deviating from the technical spirit of the present invention provided by the patent claims below.

What is claimed is:

1. A method for providing a rear cross collision warning, comprising:
dividing an area around a host vehicle into a plurality of cells arranged in lateral and longitudinal directions;
creating a grid map on which cells, among the plurality of cells, corresponding to positions where a stationary object around the host vehicle is viewed are classified as occupied cells;
determining a position, with respect to the host vehicle, of a reflective structure reflecting radar signals based on a positional relationship between the occupied cells on the grid map; and
determining, based on the determined position of the reflective structure and a moving direction and velocity of the tracking target, whether the tracking target is a ghost tracking target.

2. The method according to claim 1, wherein the creating of the grid map includes classifying cells corresponding to points where the stationary object is viewed by radar as the occupied cells.

3. The method according to claim 1, wherein the creating of the grid map includes classifying the cells corresponding to the positions where stationary object is viewed as occupied cells, in response to radar maintaining viewing rates equal to or higher than a predetermined reference viewing rate during a predetermined reference viewing cycle, or in response to a magnitude of signals received by the radar being equal to or greater than a predetermined threshold.

4. The method according to claim 1, wherein the determining of the position of the reflective structure includes determining that the occupied cells represent one reflective structure, in response to a distance between the occupied cells in a column of the grid map being within a predetermined threshold distance, and concluding that two end cells among the occupied cells determined to represent the one reflective structure are a start occupied cell and an end occupied cell, respectively, of the one reflective structure.

5. The method according to claim 1, wherein the determining of whether the tracking target is the ghost tracking target includes determining that the tracking target is the ghost tracking target, in response to the tracking target moving toward the position of the reflective structure.

6. The method according to claim 1, wherein the determining of whether the tracking target is the ghost tracking target includes determining that the tracking target is the ghost tracking target, in response to a lateral position of the tracking target being farther away from the host vehicle than a lateral position of the reflective structure is, a magnitude of a lateral positional change of the tracking target being directed in a direction toward the host vehicle, and a longitudinal position of the tracking target falling between a start point and an end point of the reflective structure.

7. The method according to claim 1, wherein the determining of whether the tracking target is the ghost tracking target includes determining that the tracking target is the ghost tracking target, in response to a lateral position of the tracking target being farther away from the host vehicle than a lateral position of the reflective structure is, a magnitude of a lateral positional change being directed in a direction toward the host vehicle, and a straight line representing a moving path of the tracking target crossing the position of the reflective structure.

8. The method according to claim 1, wherein the determining of whether the tracking target is the ghost tracking target includes determining that the tracking target is the ghost tracking target, in response to a lateral position of the tracking target falling between the position of the reflective structure and a position of the host vehicle, a lateral positional change of the tracking target being directed in a direction toward host vehicle, and a lateral acceleration of the tracking target being greater than a reference acceleration that is calculated in physical terms in a condition in which the tracking target starts moving in a stationary state from the position of the reflective structure.

9. An apparatus with rear cross collision warning, comprising:
a radar configured to view an object in a surrounding area of a host vehicle; and
a controller configured to:
divide a surrounding area of the host vehicle into a plurality of cells in lateral and longitudinal directions, and create a grid map on which cells, among the plurality of cells, corresponding to positions where a stationary object around the host vehicle is viewed are classified as occupied cells;
determine a position of a reflective structure, with respect to the host vehicle, reflecting radar signals of the radar, based on a positional relationship between the occupied cells on the grid map; and
determine, based on the determined position of the reflective structure and a moving direction and velocity of a tracking target viewed by the radar, whether the tracking target is a ghost tracking target.

10. The apparatus of according to claim 9, wherein the controller further configured to:
divide the surrounding area of the host vehicle into the plurality of cells in the lateral and longitudinal directions, and create the grid map on which the cells corresponding to the position where the stationary object around the host vehicle is viewed are classified as the occupied cells;
determine the position of the reflective structure reflecting the radar signals, based on the positional relationship between the occupied cells on the grid map; and
determine, based on the determined position of the reflective structure and either one of the position of the tracking target and the moving direction of the tracking target, whether the tracking target is the ghost tracking target.

11. The apparatus according to claim 10, wherein the controller is further configured to classify cells corresponding to points where the stationary object is viewed by the radar as occupied cells.

12. The apparatus according to claim 10, wherein the controller is further configured to classify the cells corresponding to the positions where the stationary object is viewed as the occupied cells, in response to the radar maintaining viewing rates equal to or higher than a predetermined reference viewing rate during a predetermined viewing cycle, or in response to a magnitude of signals received by the radar being equal to or greater than a predetermined threshold.

13. The apparatus according to claim 10, wherein the controller is further configured to determine that the occupied cells represent one reflective structure, in response to a distance between the occupied cells in a column of the grid map being within a predetermined threshold distance, and conclude that two end cells among the occupied cells determined to represent the one reflective structure are a start occupied cell and an end occupied cell, respectively, of the one reflective structure.

14. The apparatus according to claim 10, wherein the controller is further configured to determine that the tracking target is the ghost tracking target, in response to the tracking target moving toward the position of the reflective structure.

15. The apparatus according to claim 10, wherein the controller is further configured to determine that the tracking target is the ghost tracking target, in response to a lateral position of the tracking target being farther away from the host vehicle than a lateral position of the reflective structure is, a magnitude of a lateral positional change of the tracking target being directed in a direction toward the host vehicle, and a longitudinal position of the tracking target falling between a start point and an end point of the position of the reflective structure.

16. The apparatus according to claim 10, wherein the controller is further configured to determine that the tracking target is a ghost tracking target, in response to a lateral position of the tracking target being farther away from the host vehicle than a lateral position of the reflective structure is, a magnitude of the lateral positional change of the tracking target being directed in a direction toward the host vehicle, and a straight line representing a moving path of the tracking target crossing the position of the reflective structure.

17. The apparatus according to claim 10, wherein the controller is further configured to determine that the tracking target is the ghost tracking target, in response to a lateral position of the tracking target falling between the position of the reflective structure and a position of the host vehicle, a lateral positional change of the tracking target being directed in a direction toward the host vehicle, and a lateral acceleration of the tacking target being greater than a reference acceleration that is calculated in physical terms in a condition in which the tracking target starts moving in a stationary state from the position of the reflective structure.

\* \* \* \* \*